(12) United States Patent
Rylyakov et al.

(10) Patent No.: US 9,654,225 B2
(45) Date of Patent: May 16, 2017

(54) OPTICAL LINK ARCHITECTURE BASED ON WIRELINE EQUALIZATION TECHNIQUES

(71) Applicant: Coriant Advanced Technology, LLC, New York, NY (US)

(72) Inventors: Alexander Rylyakov, Staten Island, NY (US); Richard Younce, Naperville, IL (US); Ran Ding, New York, NY (US); Peter D. Magill, Freehold, NJ (US); Hao Li, Elmhurst, NY (US); Michael J. J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 14/858,321

(22) Filed: Sep. 18, 2015

(65) Prior Publication Data

US 2017/0085324 A1     Mar. 23, 2017

(51) Int. Cl.
| | |
|---|---|
| *H04B 10/04* | (2006.01) |
| *H04B 10/58* | (2013.01) |
| *H04L 25/03* | (2006.01) |
| *H04B 10/54* | (2013.01) |

(52) U.S. Cl.
CPC ............ *H04B 10/58* (2013.01); *H04B 10/541* (2013.01); *H04L 25/03057* (2013.01); *H04L 2025/03369* (2013.01)

(58) Field of Classification Search
CPC ...... H04B 10/40; H04B 10/43; H04L 25/4917
See application file for complete search history.

(56) References Cited

U.S. PATENT DOCUMENTS

| | | | |
|---|---|---|---|
| 7,200,308 | B2 | 4/2007 | Hochberg |
| 7,339,724 | B2 | 3/2008 | Hochberg |
| 7,424,192 | B2 | 9/2008 | Hochberg |
| 7,480,434 | B2 | 1/2009 | Hochberg |
| 7,643,714 | B2 | 1/2010 | Hochberg |
| 7,760,970 | B2 | 7/2010 | Baehr-Jones |
| 7,894,696 | B2 | 2/2011 | Baehr-Jones |
| 8,031,985 | B2 | 10/2011 | Hochberg |
| 8,067,724 | B2 | 11/2011 | Hochberg |
| 8,098,965 | B1 | 1/2012 | Baehr-Jones |

(Continued)

OTHER PUBLICATIONS

D. Li, et al., "A Low Noise Design Technique for High-Speed CMOS Optical Receivers," IEEE J. Solid-State Circuits, vol. 49, No. 6, Jun. 2014 (pp. 1437-1447).

(Continued)

*Primary Examiner* — Dzung Tran
(74) *Attorney, Agent, or Firm* — Nixon Peabody LLP

(57) ABSTRACT

A high data rate, high sensitivity, low power optical link using low-bandwidth components and low-bandwidth E/O drivers and receivers and method of building same. The method is based on the idea of making the optical part of the link look like a bandwidth limited lossy electrical channel, so that the powerful equalization methods used in the wireline electrical links can be applied to recover the transmitted data in a situation with low bandwidth and/or high loss and strong inter-symbol interference. Linear and non-linear optical channel components, E/O drivers and receivers can benefit from the apparatus and the methods of the invention.

24 Claims, 9 Drawing Sheets

(56) References Cited

U.S. PATENT DOCUMENTS

| | | |
|---|---|---|
| 8,203,115 B2 | 6/2012 | Hochberg |
| 8,237,102 B1 | 8/2012 | Baehr-Jones |
| 8,258,476 B1 | 9/2012 | Baehr-Jones |
| 8,270,778 B2 | 9/2012 | Hochberg |
| 8,280,211 B1 | 10/2012 | Baehr-Jones |
| 8,311,374 B2 | 11/2012 | Hochberg |
| 8,340,486 B1 | 12/2012 | Hochberg |
| 8,380,016 B1 | 2/2013 | Hochberg |
| 8,390,922 B1 | 3/2013 | Baehr-Jones |
| 8,798,406 B1 | 8/2014 | Hochberg |
| 8,818,141 B1 | 8/2014 | Hochberg |
| 2005/0249509 A1* | 11/2005 | Nagarajan ............... B82Y 20/00 398/198 |
| 2007/0263713 A1 | 11/2007 | Aronson |
| 2010/0046683 A1 | 2/2010 | Beukema et al. |
| 2011/0299858 A1 | 12/2011 | Mazzini et al. |
| 2014/0153620 A1* | 6/2014 | Longo ................. H04L 25/4917 375/219 |
| 2014/0255037 A1 | 9/2014 | Shang |

OTHER PUBLICATIONS

A. Rylyakov, et al., "A New Ultra-High Sensitivity, Low Power Optical Receiver Based on a Decision-Feedback Equalizer," Proc. Optical Fiber Communications Conf. (OFC), paper OThP3, Mar. 2011 (3 pages).

A. Rylyakov, et al., "A New Ultra-Sensitivity, Low Power Optical Receiver Based on a Decision-Feedback Equalizer," Proc. Optical Fiber Communications Conf. Proc. Optical Society of America, paper OThP3 2011 (3 pages).

V. Stojanovic, "Channel-Limited High-Speed Links: Modeling, Analysis and Design," A Dissertation Submitted to the Department of Electrical Engineering and The Committee on Graduate Studies of Stanford University in Partial Fulfillment of the Requirements for the Degree of Doctor of Philosophy, Sep. 2004 (180 pages).

International Search Report for Application No. PCT/US2016/052516 dated Dec. 19, 2016 (5 pages).

Written Opinion for Application No. PCT/US2016/052516 dated Dec. 19, 2016 (10 pages).

* cited by examiner

OPTICAL LINK ARCHITECTURE BASED ON WIRELINE EQUALIZATION TECHNIQUES

FIELD OF THE INVENTION

The invention relates to apparatus used for communication in general and particularly to a communication apparatus that employs optical communication signals.

BACKGROUND OF THE INVENTION

A standard, commonly accepted high-speed optical link block diagram is shown in FIG. 1, which is often referred to as a Serializer/Deserializer (SerDes). A signal to be transmitted is prepared in the digital signal processor on the transmitter side (DSP TX). The signal is then applied to the optical transmitter driver, modulator driver (E/O TX). The optical transmitter (Optical TX) sends the optical signal into the fiber/waveguide and on the receive side the optical signal is converted back into the electrical domain by the optical receiver (Optical RX), amplified by the transimpedance amplifier (E/O RX) and finally it is processed by the receiver DSP (DSP RX).

Depending on the application and the performance requirements of the link this general architecture can have many different implementation variants, but the overall structure remains largely the same. The DSP input/output (I/O) front end is analog. It can be implemented, for example, as an explicit digital to analog converter (DAC) on the TX side and an analog to digital converter (ADC) on the RX side. The algorithms implemented in the DSP can be general purpose or specific for the particular optical technology being used. Regardless of the link application and type of the coding scheme, a part of the DSP computational power is often used for equalization. For example, some versions of the DSP attempt to correct for the imperfections of the fiber, the optical-optical (O-O) part of the link. At high speeds, the relatively long electrical link E-E becomes a limiting factor and the TX/RX DSP applies equalization to correct for that. In all of these scenarios, the job of the E/O TX and E/O RX components remains the same: to faithfully convert the electrical data into the optical domain, and to convert the optical data back into the electrical domain. As a result, high bandwidth requirements are usually imposed on the E/O TX, the Optical TX, the Optical RX and the E/O RX. At high data rates, driving the Optical TX with a full bandwidth driver becomes a significant challenge, often dramatically increasing power dissipation in the E/O TX. The situation is even more dramatic on the receive side, where the bandwidth requirements and the receiver sensitivity are in a direct trade off. In addition, the high bandwidth requirement is placing a significant burden on the design and fabrication of the optical components, the Optical TX and the Optical RX.

At the same time, it is well known that equalization can be used to correct for bandwidth limitations of the transimpedance amplifier (TIA) in the E/O RX. Some papers, for example, propose placing a continuous time linear equalizer (CTLE) after a low bandwidth TIA. See for example D. Li, et al., "A Low-Noise Design Technique for High-Speed CMOS Optical Receivers," IEEE J. Solid-State Circuits, vol. 49, no. 6, pp. 1437-1447, June 2014.

Others have argued in favor of the benefits of the decision-feedback equalizer (DFE). See for example A. Rylyakov et al., "A new ultra-high sensitivity, low-power optical receiver based on a decision-feedback equalizer," Proc. Optical Fiber Communications Conf. (OFC), paper OThP3, March 2011. This approach, however, requires monolithic integration of the O/E RX functions with the RX DSP on a single chip, which is not always the best solution from the cost and power dissipation point of view. Also, it addresses only the receiver part of the link, and still requires the use of a high bandwidth transmitter.

There is a need for improved optical link apparatus and methods of operation.

SUMMARY OF THE INVENTION

According to one aspect, the invention features a SerializerDeserializer apparatus for use in an optical communication system, comprising a SerializerDeserializer transmitter (SerDes TX) having a feed-forward equalizer, a SerDes TX electrical input port and a SerDes TX electrical output port; an optical modulator having an optical modulator electrical input port in communication with the SerDes TX electrical output port and having an optical modulator optical output port; an optical carrier having a carrier optical input port in communication with the optical modulator optical output port and having a carrier optical output port; an optical demodulator having a demodulator optical input port in communication with the carrier optical output port and having an optical demodulator electrical output port; and a SerializerDeserializer receiver (SerDes RX) having at least one of a decision-feedback equalizer, a continuous time linear equalizer, a feed-forward equalizer, and a partial response maximum likelihood equalizer, a SerDes RX electrical input port in communication with the optical demodulator electrical output port and a SerDes RX electrical output port; the SerializerDeserializer apparatus configured to perform a communication using an optical signal communicated using at least one of the SerDes TX and the SerDes RX, each of which is configured to operate at a bandwidth lower than what is required to maintain a target data rate of the optical signal.

In one embodiment, the optical signal has at least one of the properties of being a linear optical signal, a low power optical signal, and a low bandwidth optical signal.

In yet another embodiment, the optical modulator comprises a Mach-Zehnder interferometer, a laser and a silicon photonic chip.

In still another embodiment, the optical demodulator comprises a photonic silicon chip, a photodetector, a transimpedance amplifier and a linear amplifier.

In a further embodiment, the optical modulator is configured to operate at a wavelength within the range of a selected one of an O-Band, an E-band, a C-band, an L-Band, an S-Band and a U-band.

In one embodiment, the SerDes TX comprises a limiting amplifier.

In another embodiment, at least one of the SerDes TX and the SerDes RX is configured to operate using pulse amplitude modulation.

In a further embodiment, the pulse amplitude modulation is a selected one of PAM-4 and PAM-N.

According to another aspect, the invention relates to a method of making a SerializerDeserializer apparatus for use in an optical communication system. The method comprises the steps of: providing a SerializerDeserializer transmitter (SerDes TX) having a feed-forward equalizer, a SerDes TX electrical input port and a SerDes TX electrical output port; providing an optical modulator having an optical modulator electrical input port in communication with the SerDes TX electrical output port and having an optical modulator optical output port; providing an optical carrier having a carrier optical input port in communication with the optical modulator optical output port and having a carrier optical output port; providing an optical demodulator having a demodulator optical input port in communication with the carrier optical output port and having an optical demodulator electrical output port; and providing a SerializerDeserializer receiver (SerDes RX) having at least one of a decision-feedback equalizer, a continuous time linear equalizer, a feed-forward equalizer, and a partial response maximum likelihood equalizer, a SerDes RX electrical input port in communication with the optical demodulator electrical output port and a SerDes RX electrical output port; such that the SerializerDeserializer apparatus is configured to perform a communication using an optical signal communicated using at least one of the SerDes TX and the SerDes RX, each of which is configured to operate at a bandwidth lower than what is required to maintain a target data rate of the optical signal.

In one embodiment, the optical signal has at least one of the properties of being a linear optical signal, a low power optical signal, and a low bandwidth optical signal In yet another embodiment, the optical modulator comprises a Mach-Zehnder interferometer, a laser and a silicon photonic chip.

In still another embodiment, the optical demodulator comprises a photonic silicon chip, a photodetector, a transimpedance amplifier and a linear amplifier.

In a further embodiment, the optical modulator is configured to operate at a wavelength within the range of a selected one of an O-Band, an E-band, a C-band, an L-Band, an S-Band and a U-band.

In one embodiment, the SerDes TX comprises a limiting amplifier.

In another embodiment, at least one of the SerDes TX and the SerDes RX is configured to operate using pulse amplitude modulation.

In a further embodiment, the pulse amplitude modulation is a selected one of PAM-4 and PAM-N.

According to another aspect, the invention relates to a method of using a SerializerDeserializer apparatus for use in an optical communication system. The method comprises the steps of: providing a SerializerDeserializer transmitter (SerDes TX) having a feed-forward equalizer, a SerDes TX electrical input port and a SerDes TX electrical output port; providing an optical modulator having an optical modulator electrical input port in communication with the SerDes TX electrical output port and having an optical modulator optical output port; providing an optical carrier having a carrier optical input port in communication with the optical modulator optical output port and having a carrier optical output port; providing an optical demodulator having a demodulator optical input port in communication with the carrier optical output port and having an optical demodulator electrical output port; providing a SerializerDeserializer receiver (SerDes RX) having at least one of a decision-feedback equalizer, a continuous time linear equalizer, a feed-forward equalizer, and a partial response maximum likelihood equalizer, a SerDes RX electrical input port in communication with the optical demodulator electrical output port and a SerDes RX electrical output port; such that said SerializerDeserializer apparatus is configured to perform a communication using an optical signal communicated using at least one of said SerDes TX and said SerDes RX, each of which is configured to operate at a bandwidth lower than what is required to maintain a target data rate of said optical signal; providing an electrical signal for transmission using the SerializerDeserializer apparatus at the SerDes TX electrical input port; recovering an electrical signal at the SerDes RX electrical output port, such that the SerializerDeserializer apparatus communicates over the optical carrier using an optical signal; and performing at least one of recording the recovered electrical signal, transmitting the recovered electrical signal to a data handling system, or to displaying the recovered electrical signal to a user.

In one embodiment, the optical signal has at least one of the properties of being a linear optical signal, a low power optical signal, and a low bandwidth optical signal.

In yet another embodiment, the optical modulator comprises a Mach-Zehnder interferometer, a laser and a silicon photonic chip.

In other embodiments, the optical modulator can comprise a modulator based on a ring resonator, or an electro-absorption modulator rather than a Mach-Zehnder interferometer.

In still another embodiment, the optical demodulator comprises a photonic silicon chip, a photodetector, a transimpedance amplifier and a linear amplifier.

In a further embodiment, the optical modulator is configured to operate at a wavelength within the range of a selected one of an O-Band, an E-band, a C-band, an L-Band, an S-Band and a U-band.

In one embodiment, the SerDes TX comprises a limiting amplifier.

In another embodiment, at least one of the SerDes TX and the SerDes RX is configured to operate using pulse amplitude modulation.

In a further embodiment, the pulse amplitude modulation is a selected one of PAM-4 and PAM-N.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION

Acronyms

Figure 1:
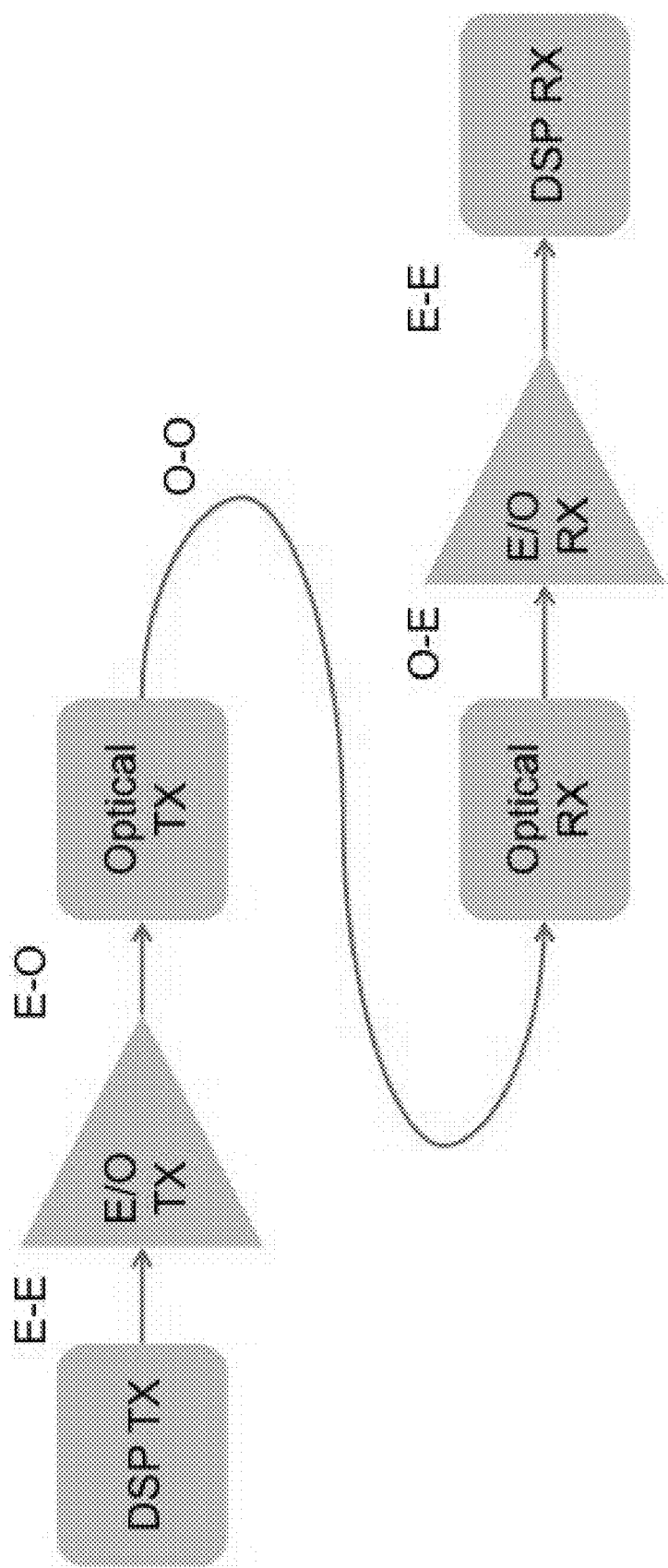
FIG. 1 is a schematic diagram of a prior art optical link.

A list of acronyms and their usual meanings in the present document (unless otherwise explicitly stated to denote a different thing) are presented below.

AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DSP Digital Signal Processor
DUT Device Under Test
ECL External Cavity Laser
E/O Electro-optical
FDTD Finite Difference Time Domain
FFE Feed-Forward Equalization
FOM Figure of Merit
FSR Free Spectral Range
FWHM Full Width at Half Maximum
GaAs Gallium Arsenide
InP Indium Phosphide
LiNO$_3$ Lithium Niobate
LIV Light intensity (L)-Current (I)-Voltage (V)
MFD Mode Field Diameter
MPW Multi Project Wafer
NRZ Non-Return to Zero
OOK On-Off Keying
PAM Pulse Amplitude Modulation, such as PAM-4, PAM-N(N=8, 12, 16, etc)
PIC Photonic Integrated Circuits
PRBS Pseudo Random Bit Sequence
PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_c \times \frac{\text{Energy Stored}}{\text{Power Loss}}.$$

QD Quantum Dot
RSOA Reflective Semiconductor Optical Amplifier
SOI Silicon on Insulator
SEM Scanning Electron Microscope
SMSR Single-Mode Suppression Ratio
TEC Thermal Electric Cooler
WDM Wavelength Division Multiplexing We describe apparatus and methods that apply equalization to both sides of the link, transmitter and receiver of a SerDes including purely optical components such as the modulator and the detector.

As used herein, the term "SerDes" means any electrical circuit that can operate as a driver/transmitter and/or a receiver in an electrical or electro-optical communication link. In different embodiments, the "SerDes" can optionally include equalization and other DSP or digital/analog/mixed-signal processing/conditioning capabilities on the transmit side and/or on the receive side. Additionally, in different embodiments, the"SerDes" can optionally have serialization/deserialization and/or re-timing capabilities. In different embodiments, the "SerDes" can be implemented as a commercially available circuit or as a custom design, as s standalone device or integrated with E/O and O/E drivers.

The approach taken in our invention is to build the entire optical part of the link (the contents of the dashed rectangle 210 in FIG. 2) using low bandwidth components, including the modulator driver E/O TX 220, the Optical TX modulator 230, the Optical RX detector 250 and the E/O RX transimpedance amplifier 260. An optical communication link 240 (such as an optical fiber) connects the Optical TX modulator 230 to the Optical RX detector 250.

Figure 2:
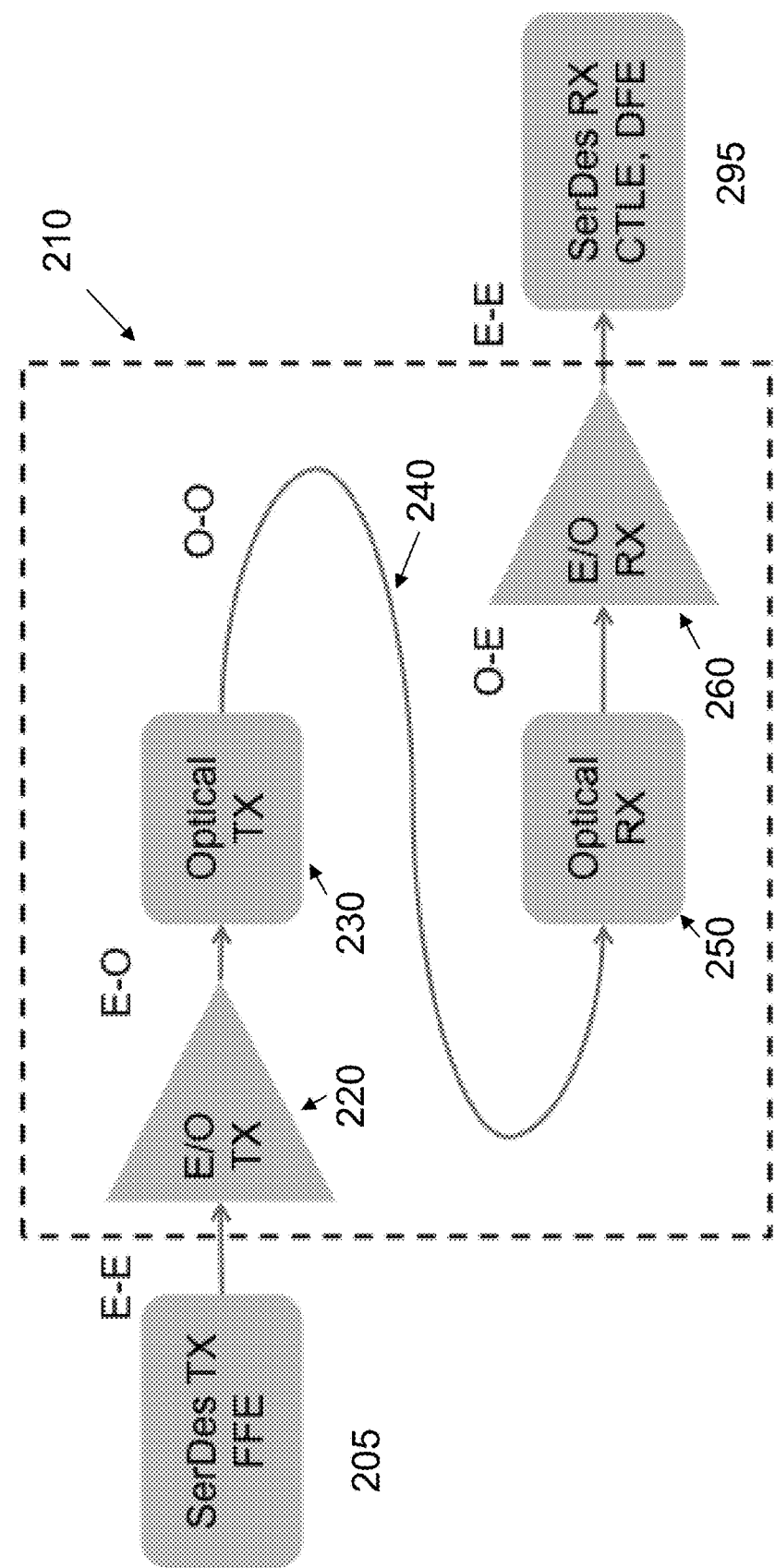
FIG. 2 is a schematic diagram of an optical link using wireline SerDes I/O with equalization according to principles of the invention.

The dashed rectangle 210 in FIG. 2 is the generalized channel, including the E/O and O/E drivers and the optical components. In the invention that is described, the generalized channel mimics a regular lossy low-bandwidth electrical channel, enabling the application of equalization power of the commercial or custom SerDes to close the link. The generalized channel can be linear or non-linear, depending on the overall requirements of the system. With higher order PAM-N coding the linearity requirements are expected to grow. When on/off NRZ coding is used we show that a non-linear low-bandwidth generalized channel can be used.

Figure 3:
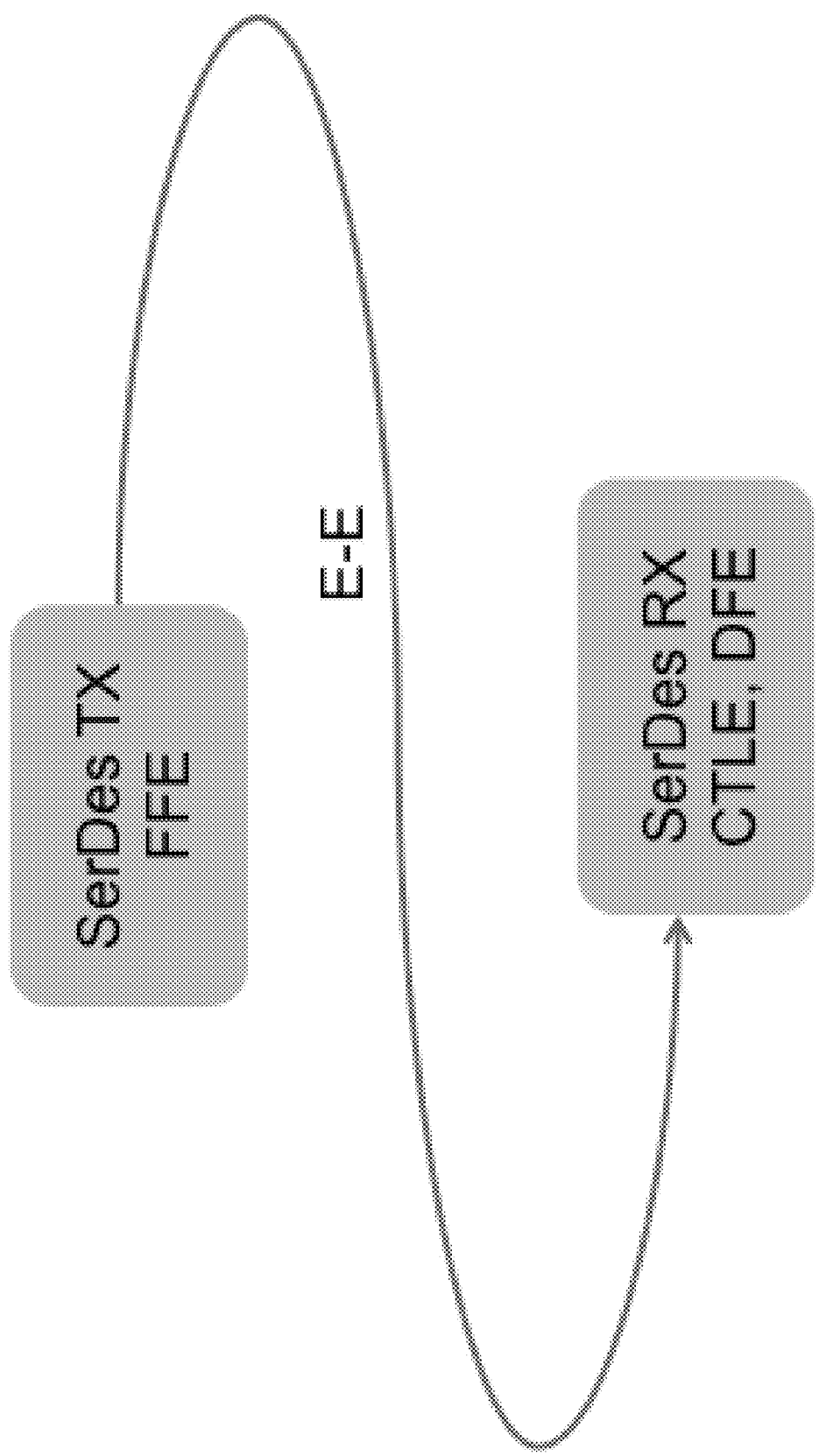
FIG. 3 is a schematic diagram of a purely electrical link based on SerDes I/O with equalization

Low bandwidth offers a number of benefits. Some of the benefits are: 1) low noise/high sensitivity, 2) simplified packaging, 3) low power dissipation, 4) cheaper components, 5) implementation in lower performance process/technology, and 6) improved optical budget. The overall view of the link that we adopt is illustrated in FIG. 2 and FIG. 3, where in place of the DSP TX and DSP RX we use a standard (or custom) wireline SerDes equipped with TX and RX equalization engines. From the equalization point of view, the link shown in FIG. 2 and the link shown in FIG. 3 could be essentially equivalent as long the total loss of the effective long E-E links are similar. We can then treat all the optical components of the link as the equivalent to a lossy electrical channel.

As used herein, the term "low power" is intended to denote an optical signal power level that is lower than one used in a full bandwidth system.

We use the purely electrical SerDes equalization to relax the bandwidth requirements of all components of the optical link, including optical devices, circuits and packaging. This allows us to trade off bandwidth for other important link parameters, such as power dissipation, optical budget, sensitivity and others, while still keeping the desired data rate.

In the prior art, some equalization techniques of low bandwidth O/E components have been argued for and demonstrated on the receive side. We would like to emphasize that there is no prior art that teaches or suggests a low bandwidth approach for the entire link, encompassing all optical and electrical components.

In sharp contrast to the commonly accepted approach we allow the modulator driver, the modulator, the detector and the TIA to introduce significant inter-symbol interference, significantly compromising signal integrity and even completely closing the eye diagram. The low limit on the optical link bandwidth is determined by the equalization capabilities of the SerDes (as shown in FIG. 2), or, equivalently, by using a DSP with analog I/O.

Figure 4:
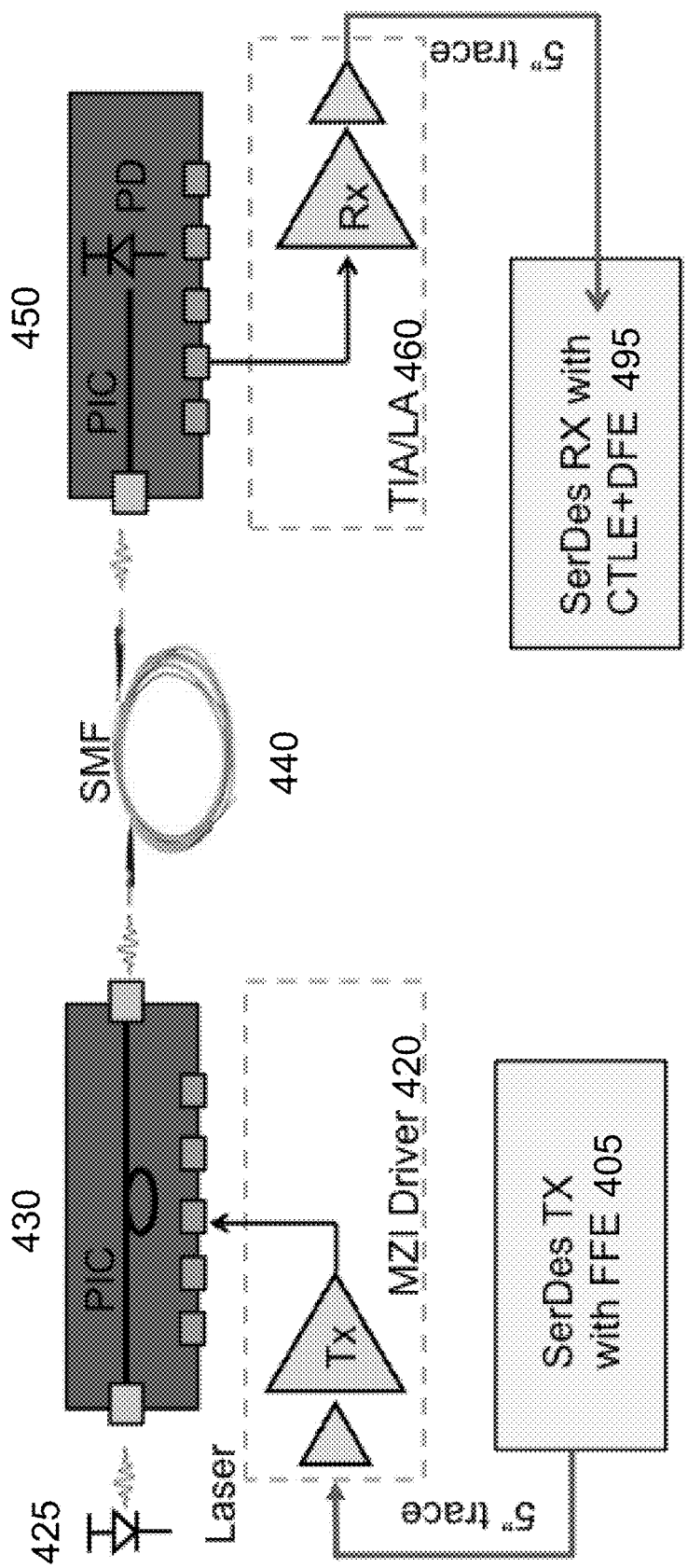
FIG. 4 is a schematic diagram of a silicon photonic communication link that is constructed according to principles of the invention.

It is important to emphasize that the systems and methods of the invention will not to work with existing standard E/O TX and E/O RX. The systems and methods of the invention require significant modifications in the design of the optical link components. One difference stems from the observation that the "equivalent" electrical link shown in FIG. 3 is mostly linear, while the E/O TX and the E/O RX have non-linear, limiting transfer functions in NRZ/OOK communications. In order to successfully mimic a lossy electrical channel, the modulator driver and the TIA have to be linear, and need to maintain the linear response across temperature and process variations and at different levels of optical power Operation FIG. 4 is a schematic diagram of a silicon photonic communication link that is constructed according to principles of the invention. FIG. 4 shows a preferred embodiment of the optical communication link, using an external laser 425, silicon photonic modulator PIC 430 and silicon photonic receiver PIC 450, MZI driver 420 and TIA/LA chips 460 as well as standard commercially available SerDes I/O with equalization 405, 495. Due to extremely high losses of the electrical links, the LR (long reach) SerDes is required to compensate for at least 25 dB of loss and often is capable of operating over the links with 35 dB and even 40 dB of loss. This corresponds to a printed circuit board (PCB) trace length reaching 40" and even 60" in some cases, depending on the materials used in the backplane PCB. In the optical link setup the typical trace lengths are much shorter. In one embodiment, we use 5" traces in the example shown in FIG. 4. The total loss in the electrical parts of the link is then estimated to be around 10 dB. We believe that with the short 10" total electrical link (plus some connectors and packaging) a large part of the equalization capabilities of the LR SerDes would remain unused and can be applied to the equalization of the optical part of the link.

We would like to point out that as long as we have fully linear E/O TX (such as a MZI driver) and E/O RX (such as a TIA with some gain and output stages), the apparatus and methods of the invention can be applied to both NRZ and PAM-N types of links, as long as the TX and RX SerDes is capable of applying the equalization on both sides of the link.

As used herein, the term "linear" is intended to denote a mathematical relationship in which a dependent variable (such as y or (y(t)) is related to an independent variable (such as x or x(t)) by a relationship that can be written as y=Ax+B, in which A and B are constant with respect to the variables x and y.

Pulse-amplitude modulation (PAM), is a form of bipolar non-return-to-zero signal modulation where the message information is encoded in the amplitude of a series of signal pulses. It is an analog pulse modulation scheme in which the amplitudes of a train of carrier pulses are varied according to the sample value of the message signal. Demodulation is performed by detecting the amplitude level of the carrier at every symbol period. In various embodiments, pulse-amplitude modulation is utilized according to a PAM-4 (4-level pulse amplitude modulation) protocol, in which 2 bits of data are encoded per symbol, rather than only one bit of data. Other PAM embodiments include PAM-N, where N is a positive integer, for example=8, 16, 32, 64, or higher. The systems and methods described work with all other amplitude modulation coding schemes, including duo-binary, and so on.

Another important observation is that the linearity requirements imposed by the apparatus and methods of the invention are not particularly stringent. In fact, with NRZ coding even a limiting driver on the TX side would work, because some of the TX FFE equalization would travel through the edge positions in the transmitted eye. This is illustrated in FIG. 5 and FIG. 6.

Feed-Forward Equalization (FFE) is an equalization technique that corrects the received waveform with information about the waveform itself. FFE does not use information based on logical decisions made on the waveform. FFE uses the voltage levels of the received waveform associated with previous and current bits to correct the voltage level of the current bit. This is similar to the behavior of a finite impulse response (FIR) filter.

In various embodiments, the systems of the invention can employ any of a decision-feedback equalizer, a continuous time linear equalizer, a feed-forward equalizer, and a partial response maximum likelihood equalizer. In general, any type of equalization suitable for compensating for low bandwidth is believed to be suitable for use in the present invention.

Figure 5:
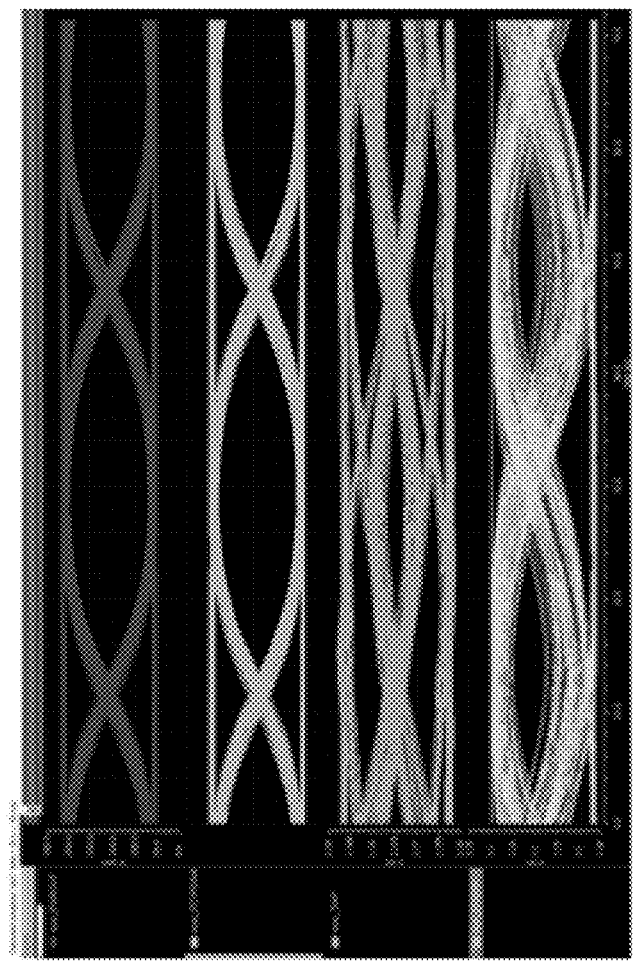
FIG. 5 is a screen shot illustrating a full link simulation at 28 Gb/s, with no FFE applied in the TX SerDes.
Figure 6:
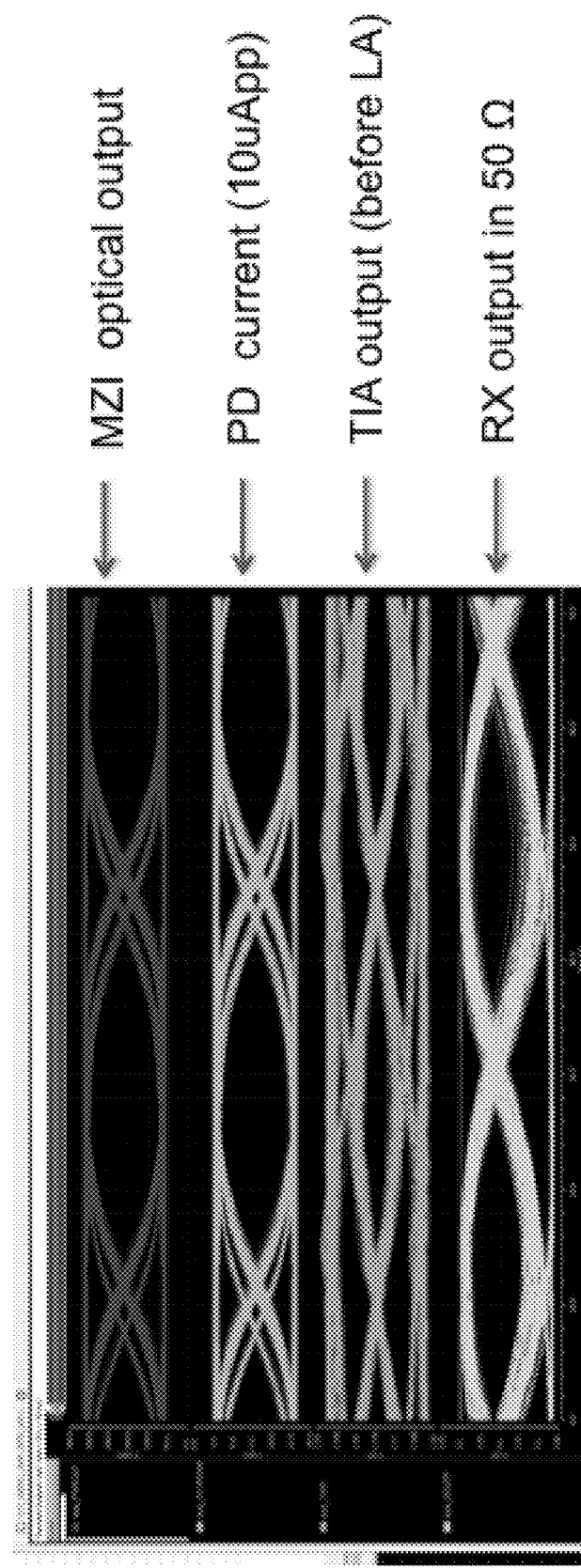
FIG. 6 is a screen shot illustrating a full link simulation at 28 Gb/s, with a strong (tap=−0.5) FFE applied in the TX SerDes.

FIG. 5 is a screen shot illustrating a full link simulation at 28 Gb/s, with no FFE applied in the TX SerDes. The RX eye looks compromised even though the MZI and PD eye diagrams are widely open.

FIG. 6 is a screen shot illustrating a full link simulation at 28 Gb/s, with a strong (tap=−0.5) FFE applied in the TX SerDes. The adjusted edge positions (MZI and PD traces) help open the RX eye, even though the MZI driver is fully limiting.

Figures 7A, 7B:
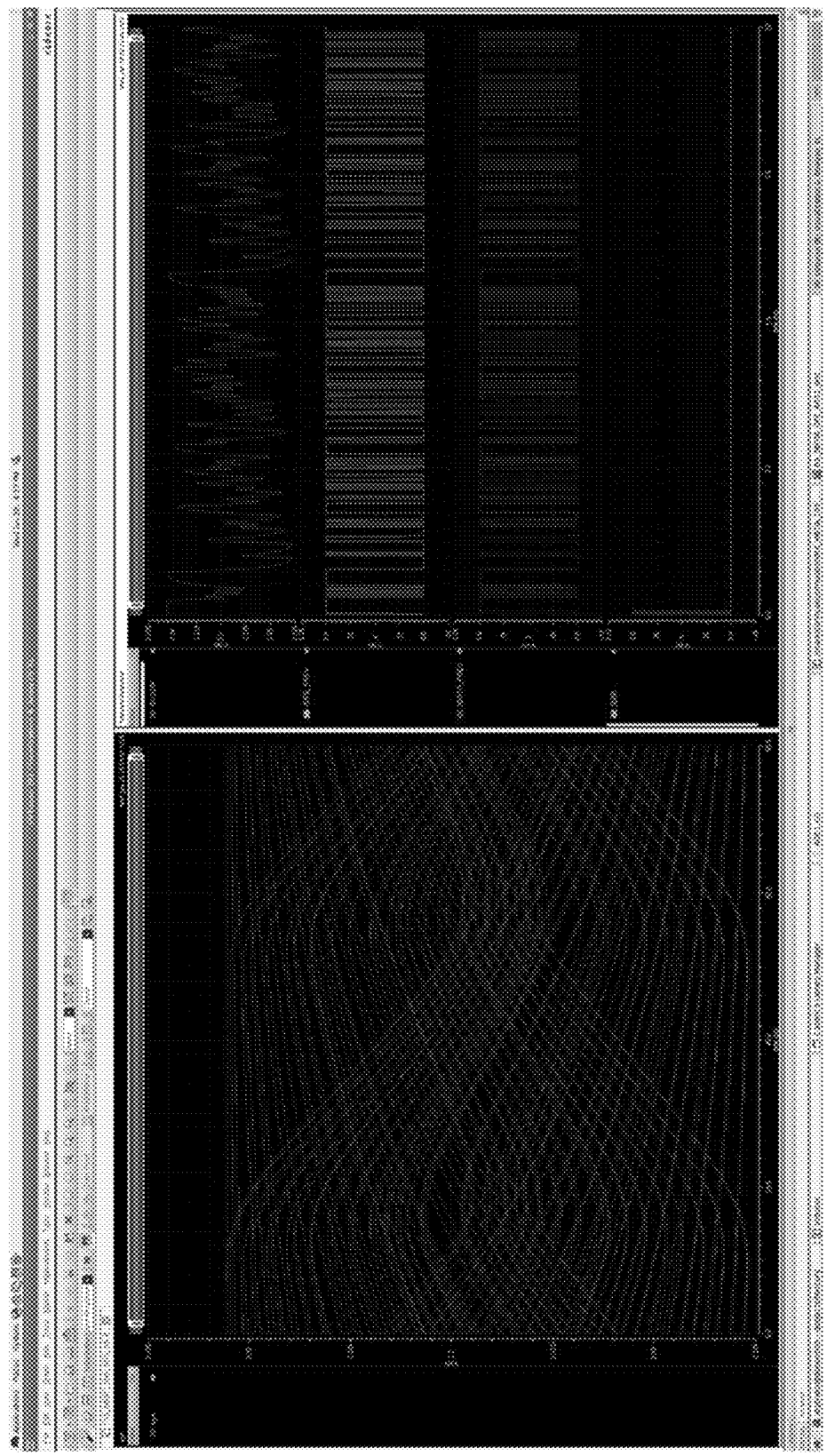
FIG. 7A is a screen shot illustrating a low bandwidth TIA output eye diagram.
FIG. 7B is a screen shot illustrating the input and output signals of the DFE in the SerDes, showing correctly received data.

FIG. 7A and FIG. 7B illustrate the benefits of the DFE based receiver in a low bandwidth optical link. FIG. 7A is a screen shot illustrating a low bandwidth TIA output eye diagram. FIG. 7B is a screen shot illustrating the input and output signals of the DFE in the SerDes, showing correctly received data.

Even though the TIA output eye diagram is fully closed as shown in in FIG. 7A, all the bits are recovered and received correctly as shown in FIG. 7B.

Figure 8:
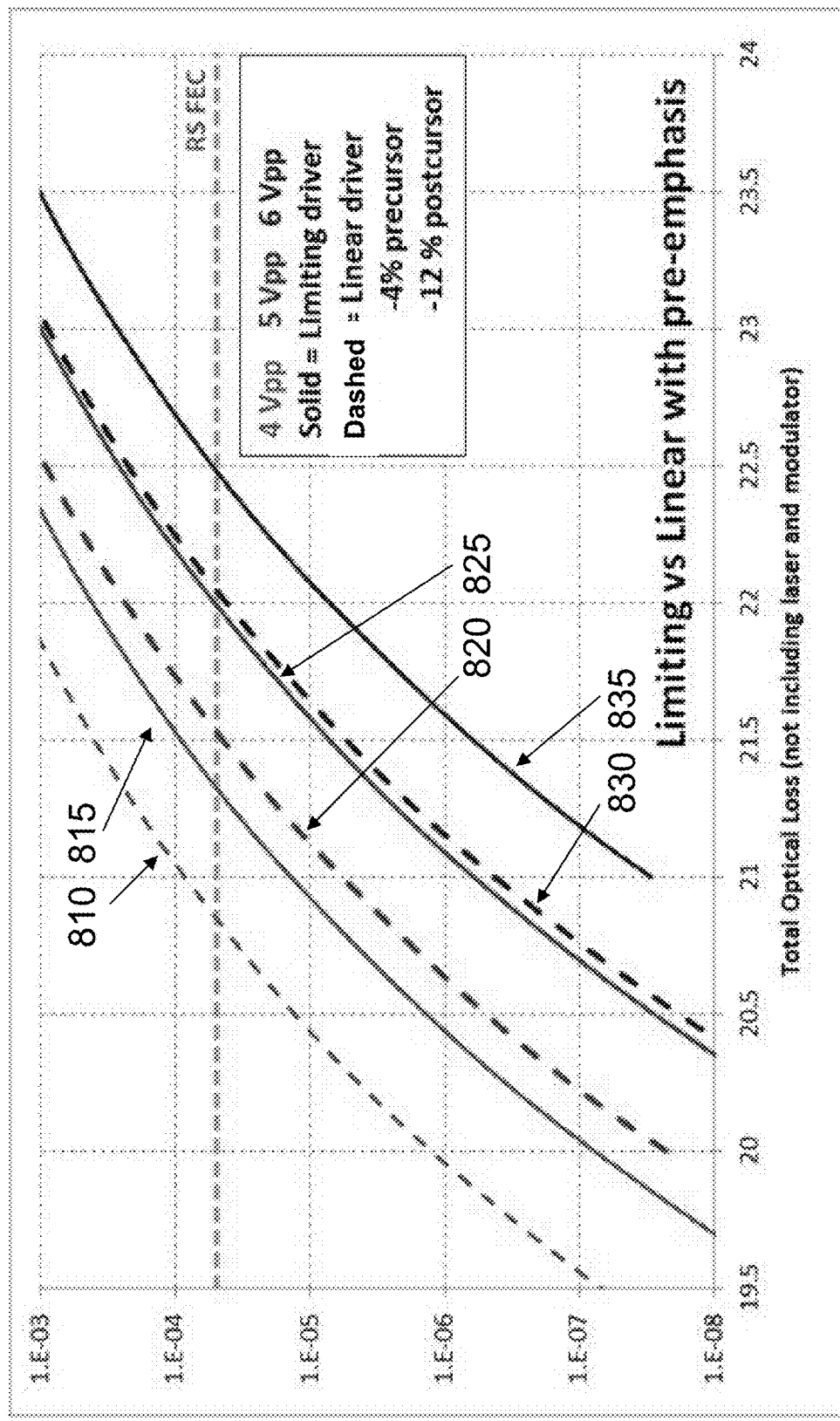
FIG. 8 is a graph illustrating the full link BER as a function of the optical loss in the link, for the limiting and linear modulator drivers, with 3-tap FFE and different levels of the driver amplitude (4Vpp—curves 810,815; 5Vpp—curves 820, 825; and 6Vpp—curves 830, 835).

FIG. 8 is a graph illustrating the full link BER as a function of the optical loss in the link, for the limiting and linear modulator drivers, with 3-tap FFE and different levels of the driver amplitude (4Vpp—curves 810,815; 5Vpp—curves 820, 825; and 6Vpp—curves 830, 835). FIG. 8 shows the results of a link-level simulation, comparing a linear modulator driver vs. a limiting one, in the presence of transmitter side equalization (TX SerDes FFE). In this simulation the FFE tap weights are fixed and we vary the drive signal strength. The best BER performance is demonstrated by the 6Vpp limiting driver, while a 6Vpp linear driver is only marginally better than a 5Vpp limiting driver. We conclude that for NRZ communication a limiting driver is better even though it clearly cannot fully transfer the benefits of TX FFE to the receiver. A limiting driver can be a limiting amplifier.

Figure 9:
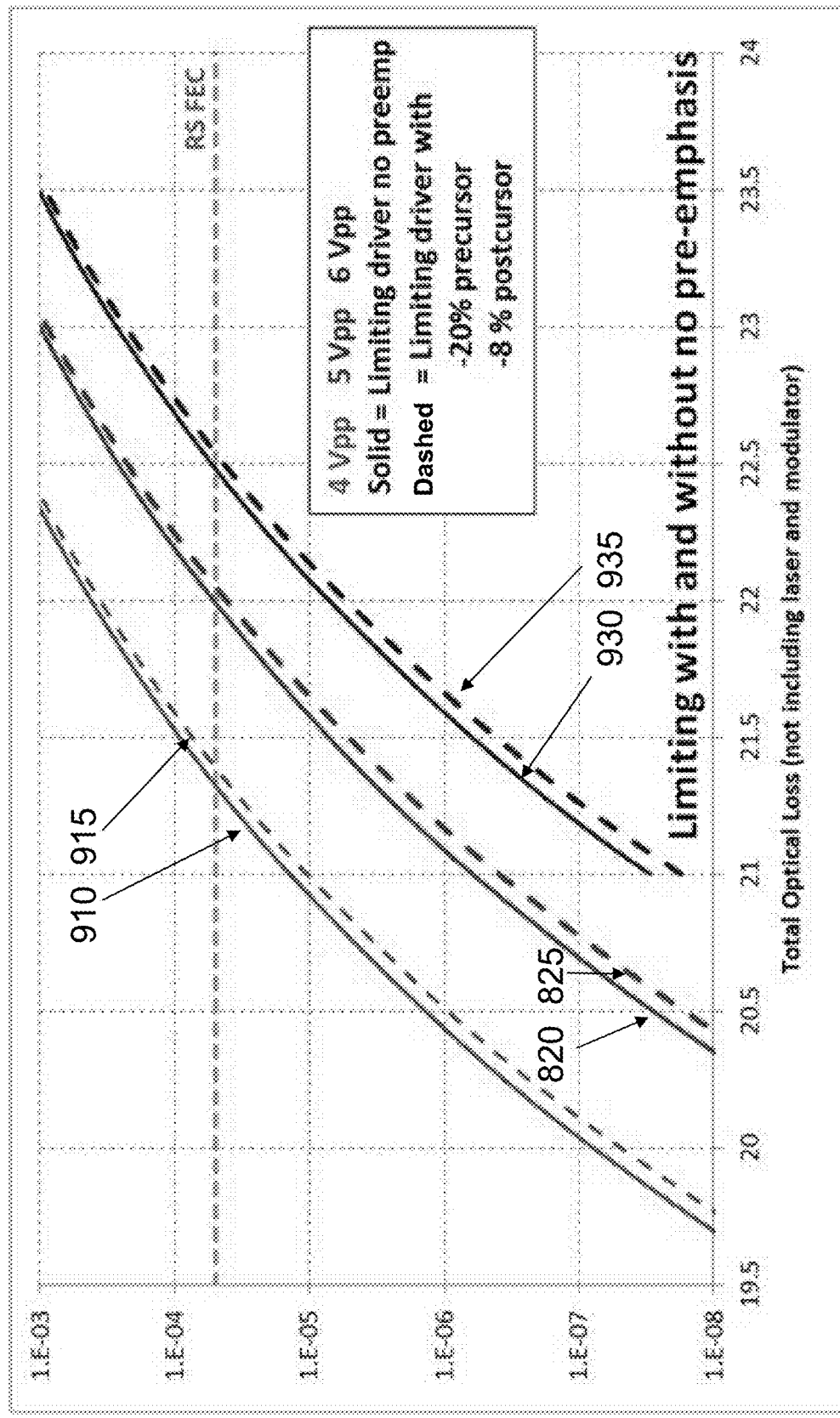
FIG. 9 is a graph illustrating the full link BER for a limiting driver, with and without FFE, at various driver amplitudes (4Vpp—curves 910, 915; 5Vpp—curves 920, 925; and 6Vpp—curves 930, 935). TX SerDes FFE travels through the limiting driver and helps close the link.

FIG. 9 is a graph illustrating the full link BER for a limiting driver, with and without FFE, at various driver amplitudes (4Vpp—curves 910, 915; 5Vpp—curves 920, 925; and 6Vpp—curves 930, 935). TX SerDes FFE travels through the limiting driver and helps close the link. In FIG. 9 we compare BER of the limiting driver link with and without pre-emphasis. As in FIG. 5 and FIG. 6 above, we observe that having TX SerDes FFE helps close the link even when the modulator driver is limiting.

Nyquist Rate and Nyquist Frequency

The Nyquist rate is a property of a continuous-time signal, whereas the Nyquist frequency is a property of a discrete-time signal processing system.

In signal processing, the Nyquist rate is twice the bandwidth of a bandlimited function or a bandlimited channel. This term means two different things under two different circumstances.

As a lower bound for the sample rate for alias-free signal sampling.

As an upper bound for the symbol rate across a bandwidth-limited baseband channel such as a telegraph line or passband channel such as a limited radio frequency band or a frequency division multiplex channel.

The Nyquist frequency is half of the sampling rate of a discrete signal processing system. It is sometimes known as the folding frequency of a sampling system, where $f_s$ is the sampling rate and $0.5\ f_s$ is the corresponding Nyquist frequency.

The Nyquist-Shannon sampling theorem is a fundamental bridge between continuous-time signals (often called "analog signals") and discrete-time signals (often called "digital signals"). It establishes a sufficient condition for a sample rate that permits a discrete sequence of samples to capture all the information from a continuous-time signal of finite bandwidth. The theorem states that if a function x(t) contains no frequencies higher than B hertz, it is completely determined by giving its ordinates at a series of points spaced 1/(2B) seconds apart. In real systems, one often samples so as to obtain data more closely spaced in time than is specified by the theorem.

It is therefore possible to define for any signal a target data rate, for example N bits of information per second, where N can be a number greater than zero and ranging up to tens or hundreds of Gigabits, and through the use of well-known information theory principles, to define how such a signal would need to be sampled so as to provide sufficient information to reconstruct a copy of a received signal that allows the reconstructed signal to accurately represent the original signal that was transmitted, in analog or in digital form.

In particular, the present invention makes possible operation of SerDes hardware at a bandwidth lower than what is required to maintain a target data rate of an optical signal. By way of example, in a 28 Gb/s system, lower than 0.75 of the data rate means a bandwidth lower than 21 GHz.

Benefits and Advantages of the Invention

It is believed that apparatus constructed using principles of the invention and methods that operate according to principles of the invention can provide the following benefits and advantages.

A high data rate, high sensitivity, low power optical link using low-bandwidth components and low-bandwidth E/O drivers and receivers and methods of making and using the same. The apparatus and methods are based on the idea of making the optical part of the link linear, so that the powerful equalization methods used in the wireline electrical links can be applied to recover the transmitted data in a situation with high loss and inter-symbol interference.

A linear low bandwidth E/O transmitter (MZI driver, ring driver, EAM driver, EML driver, DML driver, VCSEL driver, and so on) allowing the transmitter side FFE to travel through all components of the link to the receiver and help correctly recover the bits on the receive side, and methods of making and using the same.

A low bandwidth non-linear or limiting E/O transmitter, allowing the TX FFE action to travel through the positions of the edges, and methods of making and using the same.

A low bandwidth linear MZI (or any other similar type of optical transmitter) for high data rate communication, and methods of making and using the same.

A low bandwidth PD (or any other similar type of optical receiver) for high data rate optical communication, and methods of making and using the same.

A low bandwidth TIA (or any other similar type of electro-optical receiver) for high data rate optical communication, and methods of making and using the same.

Apparatus and methods of using commercially available or custom SerDes, or any other type of transceiver with equalization for establishing a high data rate optical link using low bandwidth optical components.

It is believed that apparatus constructed using principles of the invention and methods that operate according to principles of the invention can be used in the wavelength ranges described in Table I.

TABLE I

| Band | Description | Wavelength Range |
| --- | --- | --- |
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

Design and Fabrication

Methods of designing and fabricating devices having elements similar to those described herein are described in one or more of U.S. Pat. Nos. 7,200,308, 7,339,724, 7,424,192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

DEFINITIONS

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides. In some embodiments, an optical carrier may include more than one fiber, for example, one fiber in each transmission direction.

THEORETICAL DISCUSSION

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A system for transmitting an optical signal at a target data rate in an optical communication network, comprising:
   a SerializerDeserializer transmitter (SerDes TX) having a feed-forward equalizer, a SerDes TX electrical input port, and a SerDes TX electrical output port capable of generating an optical signal at the target data rate;
   an optical modulator capable of operating at only a lower data rate of less than 0.75 of the target data rate, thereby generating inter-symbol interference, and including:
      a linear transfer function;
         an optical modulator electrical input port in communication with said SerDes TX electrical output port; and
         an optical modulator optical output port for optically coupling to an optical carrier having a carrier optical input port in communication with said optical modulator optical output port and a carrier optical output port;
   an optical demodulator capable of operating at only a lower data rate of less than 0.75 of the target data rate, thereby generating inter-symbol interference, and including:
      a linear transfer function,
         a demodulator optical input port in communication with said carrier optical output port, and
         an optical demodulator electrical output port; and
   a SerializerDeserializer receiver (SerDes RX), including:
      at least one of a decision-feedback equalizer, a continuous time linear equalizer, a feed-forward equalizer, and a partial response maximum likelihood equalizer capable of compensating for the lower data rate optical demodulators, and generating an electric signal corresponding to the target data rate,
      a SerDes RX electrical input port in communication with said optical demodulator electrical output port, and
      a SerDes RX electrical output port.

2. The system of claim 1, wherein said system is capable of transmitting an optical signal comprising
   a linear optical signal, a low power optical signal, and a low bandwidth optical signal.

3. The system of claim 1, wherein said optical modulator comprises a Mach-Zehnder interferometer, a laser, and a silicon photonic chip.

4. The system of claim 1, wherein said optical demodulator comprises a photonic silicon chip, a photodetector, a transimpedance amplifier, and a linear amplifier.

5. The system of claim 1, wherein said optical modulator is configured to operate at a wavelength within the range of a selected one of an O-Band, an E-band, a C-band, an L-Band, an S-Band and a U-band.

6. The system of claim 1, wherein said SerDes TX includes a limiting amplifier.

7. The system of claim 1, wherein at least one of said SerDes TX and said SerDes RX is configured to operate using pulse amplitude modulation.

8. The system of claim 7, wherein said pulse amplitude modulation is a selected one of PAM-4 and PAM-N.

9. A method for transmitting an optical signal at a target data rate in an optical communication system, comprising the steps of:
   generating the optical signal at the target data rate using a SerializerDeserializer transmitter (SerDes TX) having a feed-forward equalizer, a SerDes TX electrical input port and a SerDes TX electrical output port;
   modulating the optical signal with an optical modulator at a lower data rate of less than 0.75 of the target data rate, thereby generating inter-symbol interference, wherein the optical modulator includes: a linear transfer function; an optical modulator electrical input port in communication with said SerDes TX electrical output port; and an optical modulator optical output port;
   transmitting the optical signal over an optical carrier having a carrier optical input port in communication with said optical modulator optical output port and having a carrier optical output port;
   demodulating the optical signal using an optical demodulator at a lower data rate of less than 0.75 of the target data rate, thereby generating inter-symbol interference, wherein the demodulator includes a linear transfer function, a demodulator optical input port in communication with said carrier optical output port, and an optical demodulator electrical output port; and
   generating an output electrical signal using a SerializerDeserializer receiver (SerDes RX) capable of compensating for the lower data rate optical demodulator and generating an electric signal corresponding to the target data rate, and comprising
      at least one of a decision-feedback equalizer, a continuous time linear equalizer, a feed-forward equalizer, and a partial response maximum likelihood equalizer,
      a SerDes RX electrical input port in communication with said optical demodulator electrical output port and
      a SerDes RX electrical output port.

10. The method of claim 9, wherein said optical signal comprises a linear optical signal, a low power optical signal, and a low bandwidth optical signal.

11. The method of claim 9, wherein said optical modulator comprises a Mach-Zehnder interferometer, a laser, and a silicon photonic chip.

12. The method of claim 9, wherein said optical demodulator comprises a photonic silicon chip, a photodetector, a transimpedance amplifier and a linear amplifier.

13. The method of claim 9, wherein said optical modulator is configured to operate at a wavelength within the range of a selected one of an O-Band, an E-band, a C-band, an L-Band, an S-Band and a U-band.

14. The method of claim 9, wherein said SerDes TX includes a limiting amplifier.

15. The method of claim 9, wherein at least one of said SerDes TX and said SerDes RX is configured to operate using pulse amplitude modulation.

16. The method of claim 15, wherein said pulse amplitude modulation is a selected one of PAM-4 and PAM-N.

17. A method of transmitting an optical signal at a target data rate in an optical communication network, comprising the steps of:
providing a SerializerDeserializer transmitter (SerDes TX) capable of generating an optical signal at the target data rate, and including: a feed-forward equalizer; a SerDes TX electrical input port; and a SerDes TX electrical output port;
providing an optical modulator having a lower data rate of less than 0.75 of the target data rate, thereby generating inter-symbol interference, and including: a linear transfer function; an optical modulator electrical input port in communication with said SerDes TX electrical output port; and an optical modulator optical output port in communication with a carrier optical input port of an optical carrier;
providing an optical demodulator having a lower data rate of less than 0.75 of the target data rate, thereby generating inter-symbol interference, and including: a linear transfer function; a demodulator optical input port in communication with a carrier optical output port of the optical carrier; and an optical demodulator electrical output port;
providing a SerializerDeserializer receiver (SerDes RX) capable of compensating for the low data rate optical demodulator and generating an electric signal corresponding to the target data rate, and including:
at least one of a decision-feedback equalizer, a continuous time linear equalizer, a feed-forward equalizer, and a partial response maximum likelihood equalizer,
a SerDes RX electrical input port in communication with said optical demodulator electrical output port and
a SerDes RX electrical output port;
providing an electrical signal for transmission using said SerializerDeserializer apparatus at said SerDes TX electrical input port;
recovering an electrical signal at said SerDes RX electrical output port, such that said SerializerDeserializer apparatus communicates over said optical carrier using an optical signal; and
performing at least one of recording said recovered electrical signal, transmitting said recovered electrical signal to a data handling system, or displaying said recovered electrical signal to a user.

18. The method of claim 17, wherein said optical signal comprises a linear optical signal, a low power optical signal, and a low bandwidth optical signal.

19. The method of claim 17, wherein said optical modulator comprises a Mach-Zehnder interferometer, a laser and a silicon photonic chip.

20. The method of claim 17, wherein said optical demodulator comprises a photonic silicon chip, a photodetector, a transimpedance amplifier, and a linear amplifier.

21. The method of claim 17, wherein said optical modulator is configured to operate at a wavelength within the range of a selected one of an O-Band, an E-band, a C-band, an L-Band, an S-Band and a U-band.

22. The method of claim 17, wherein said SerDes TX includes a limiting amplifier.

23. The method of claim 17, wherein at least one of said SerDes TX and said SerDes RX is configured to operate using pulse amplitude modulation.

24. The method of claim 23, wherein said pulse amplitude modulation is a selected one of PAM-4 and PAM-N.

* * * * *